May 1, 1934. C. W. JOHNSTON 1,956,578
TIRE DEFLATION INDICATOR SWITCH
Filed July 8, 1932 3 Sheets-Sheet 1
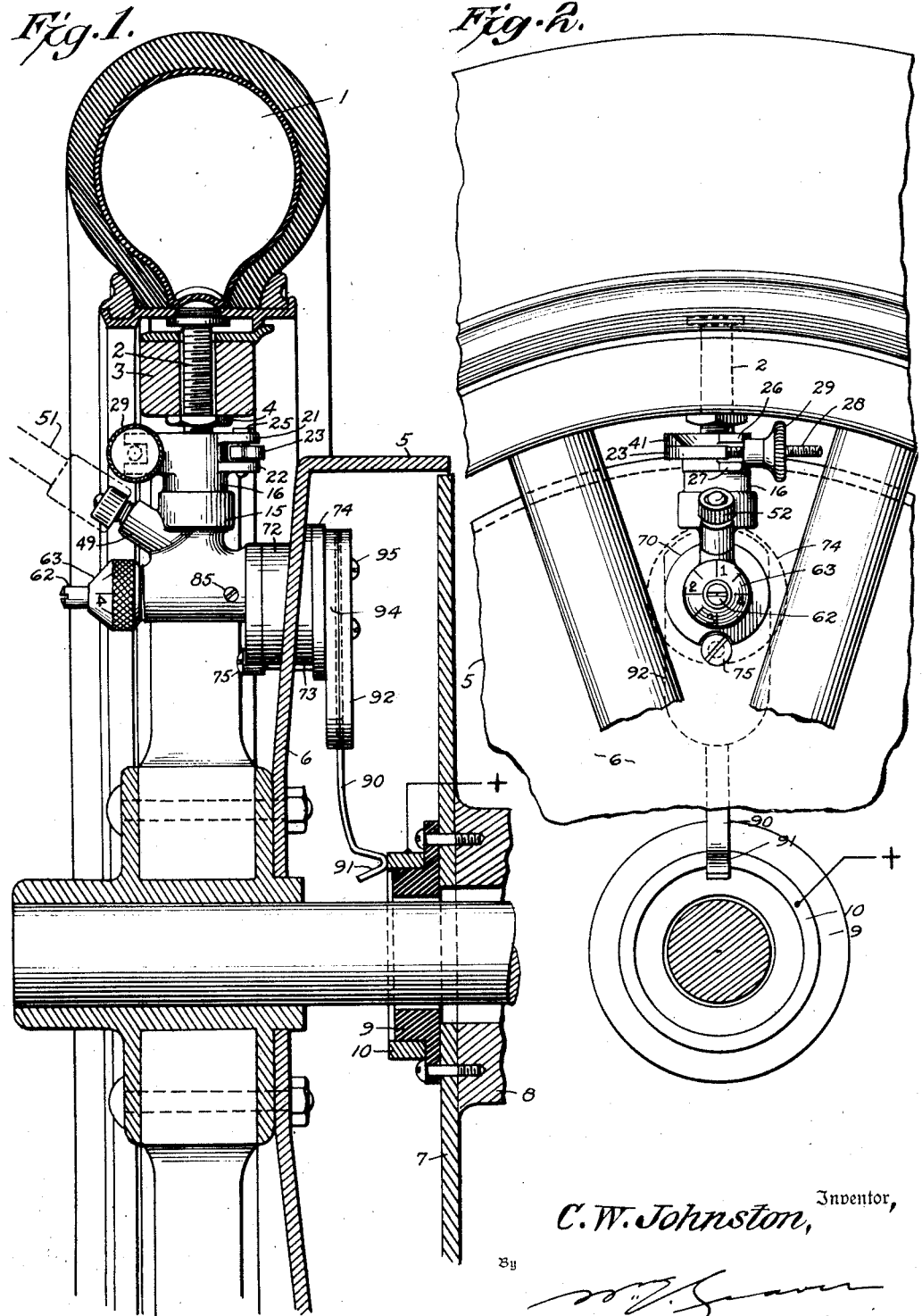
C. W. Johnston, Inventor,
By
Attorney May 1, 1934.  C. W. JOHNSTON  1,956,578
TIRE DEFLATION INDICATOR SWITCH
Filed July 8, 1932   3 Sheets-Sheet 2
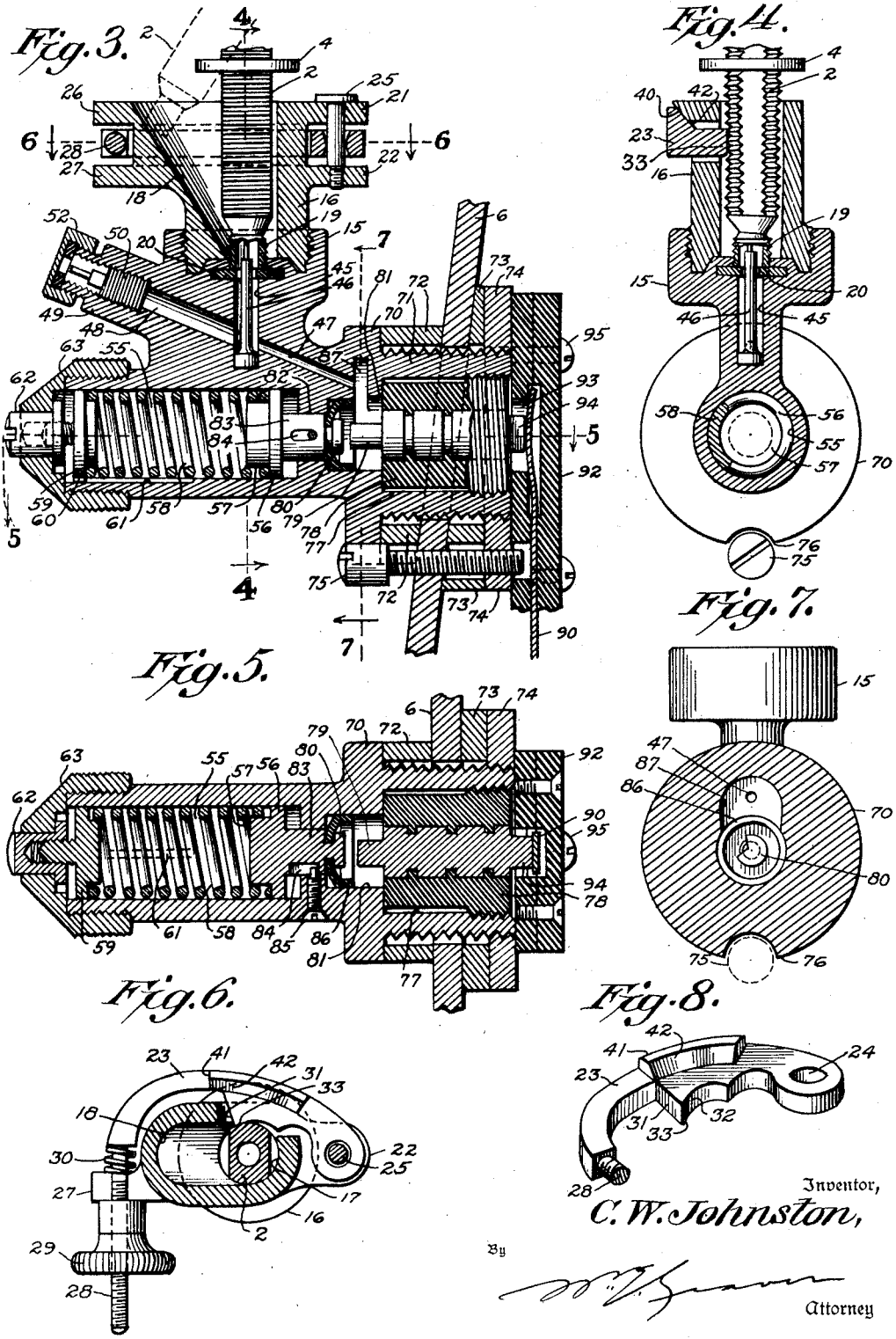
Inventor,
C. W. Johnston,
By
Attorney May 1, 1934. C. W. JOHNSTON 1,956,578
TIRE DEFLATION INDICATOR SWITCH
Filed July 8, 1932   3 Sheets-Sheet 3
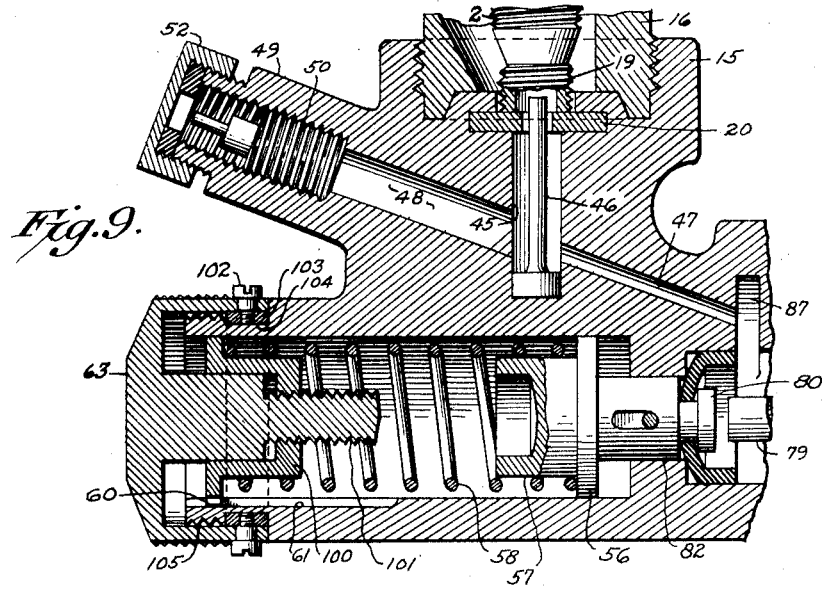
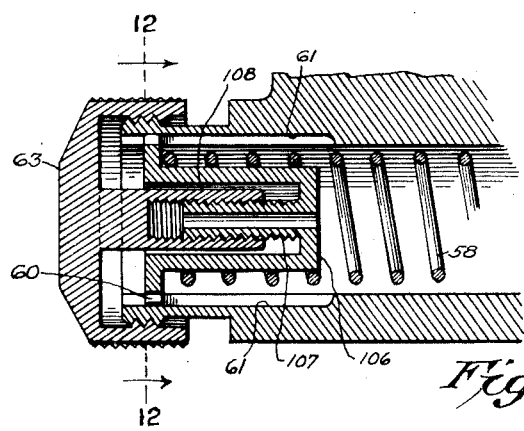
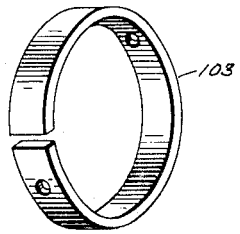
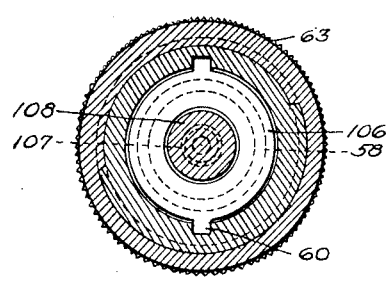
Inventor,
C. W. Johnston,
By
Attorney Patented May 1, 1934

1,956,578

UNITED STATES PATENT OFFICE 1,956,578

TIRE DEFLATION INDICATOR SWITCH

Carey W. Johnston, Newark, N. J.

Application July 8, 1932, Serial No. 621,452

8 Claims. (Cl. 200—58)

This invention relates to a switch for a tire deflation indicator and has for its object to provide a construction cheap in manufacturing costs and more efficient in operation than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views, Fig. 1 is a partial vertical sectional view taken through an automobile wheel illustrating the application of this device to the valve of the tire.

Fig. 2 is a side elevational view of the parts shown in Fig. 1, with portions of the brake drum broken away to illustrate the electrical connection between this device and a circuit including an indicator for showing tire deflation;

Fig. 3 is a vertical sectional view through the device in its assembled and applied position;

Fig. 4 is a vertical sectional view taken as on the line 4—4 of Fig. 3 and looking in the direction of the arrows;

Fig. 5 is a horizontal sectional view taken as on the line 5—5 of Fig. 3 and looking in the direction of the arrows;

Fig. 6 is a horizontal sectional view of the clamp utilized in securing this device to the tire valve, said view being taken as on the line 6—6 of Fig. 3 and looking in the direction of the arrows;

Fig. 7 is a vertical sectional view through the air chamber of this device, as seen on the line 7—7 of Fig. 3 when looking in the direction of the arrows;

Fig. 8 is a perspective view of the movable clamp member illustrated in Fig. 6;

Fig. 9 is a partial sectional view similar to Fig. 3 but illustrating a modified form of spring adjustment;

Fig. 10 is a perspective view of the split ring employed in the construction shown in Fig. 9;

Fig. 11 is a partial sectional view illustrating a further modification of the spring adjustment; and Fig. 12 is a transverse sectional view taken as on the line 12—12 of Fig. 11 and looking in the direction of the arrows.

According to this invention there is provided a mechanism which in effect is an electrical switch adapted to be opened when the proper pressure is maintained in a tire but which is adapted to automatically close when said pressure falls below a predetermined amount. When the switch closes, current from any suitable source will be permitted to travel through a circuit including an indicator, such as a light or any other suitable device, to attract attention to the fact that that particular tire has a decreased pressure. The indicator may be mounted on the instrument board and comprises preferably four electric lamps constituting signals, the circuits of which are normally open and each circuit controlled by one of the devices herein described, each device associated with a vehicle wheel and the tire thereof so that when the air pressure in any one tire drops below a predetermined amount, the lamp associated with that tire will be illuminated. Economically, these devices may be connected in the ignition circuit of the automobile so that the indicating signals will function only when the ignition circuit is closed.

The device is adapted to be securely attached to a wheel for rotation therewith, the tire valve also adapted to be clamped tightly within a portion of the device so that pressure of the air in the tire will at all times be communicated to an air chamber within the device, there being further contemplated a positive but flexible electrical connection between the rotating device and a stationary part of the automobile so that current may flow in the indicator circuit whenever the switch contacts of the device are closed.

Referring to the drawings, 1 indicates a tire provided with the usual valve 2 extending down through the felly 3 of the automobile wheel, said valve having the usual lock nut 4 which, however, could be dispensed with if desired. 5 represents generally the brake drum, the flat wall 6 of which is secured as usual to the hub portion of the wheel, and therefore rotatable therewith, and 7 indicates the stationary plate either integral with or secured to the axle housing indicated at 8. Concentrically mounted on the inner face of the plate 7 is a circular block 9 of insulation, carrying an annular electrical commutator or conductor ring 10 having a contact surface disposed in a plane perpendicular to the axle.

Particularly referring to Fig. 3 there is shown in detail a vertical section of one of these switch devices. It comprises a main casting 15 to which may be secured a second casting 16 although these two castings could be made unitary if desired, the principal reason for making them separate being to facilitate access to the seat for the tire valve.

The upper casting 16 is provided with a V-shaped bore or pocket which is formed by a vertical drilling of a diameter just slightly greater than the outside diameter of the tire valve 2. The axis of this bore is radial with respect to the wheel, thereby providing a rear wall surface 17 which is perpendicular to the axle and against which the tire valve is forced by the clamp to be described later. The front wall 18 of this valve pocket is produced by a bore of similar diameter but whose axis is inclined at an angle of about 20 to 30 degrees to a radius of the wheel, the two bores meeting at the lowermost extremity of the casting 16 and the metal from between said bores removed, all as will be clearly understood from Figs. 3 and 6. The lower extremity of the bore 17 is slightly reduced in diameter to permit the cap-receiving portion 19 of the valve to pass therethrough and be seated upon the rubber washer 20 caged within the upper portion of the casting 15.

The casting 16 has at its uppermost portions a pair of horizontally and rearwardly extending lugs 21 and 22 to receive therebetween the rear end of a clamp member generally indicated by the numeral 23, said end being provided with an aperture 24 to receive therethrough the hinge pin 25 threaded into the lower lug 22. The opening 24 is made of a sufficient shape and/or diameter to permit a slight canting of the clamp member 23 on said pin.

Diametrically opposite the lugs 21 and 22 are the lugs 26 and 27 providing a space therebetween through which passes the threaded end or stem 28 of the clamp member 23, it being understood from Fig. 6 that said member is curved as shown to fit around the upper portion of the casting 16 and to provide pivotal movement about the pin 25. A nut 29, threaded on said stem, takes against a side of the lugs 26 and 27, and a spring 30 is provided between the other side of said lugs and a shoulder of the member 23 formed at the base of said stem. The inner or concave side of the member 23 has formed thereon an extension 31 passing through a slot in the wall of casting 16, the innermost surface of said extension being arcuately formed as indicated at 32 with a curvature of a radius equal to or slightly greater than the radius of the tire valve 2. This surface is so positioned that when the member 23 is drawn toward the casting 16, the point 33 of said extension will contact the tire valve at a point on its surface so that further pressure of the clamp will force said valve against the rear wall 17 of the V-pocket.

On one side of the casting 16 at the uppermost extremity thereof, the wall is thickened and provided exteriorly with an undercut surface 40 of substantially 45° inclination, and on the upper side of the clamp member 23 is a vertically extending lug 41 whose inner edge is chamfered or bevelled to provide the surface 42 of substantially the same inclination as, and adapted to cooperate with, the surface 40 of the casting, see Figs. 2, 4 and 8. It thus results that when the nut 29 is screwed upon the stem 28, the clamp member 23 will be swung inwardly with respect to the casting 16, and the two bevelled surfaces 40 and 42 will produce a camming action causing a canting or generally downward movement of said clamp member, as a result of which the tire valve is forced axially downward in the V-shaped pocket and thus brought more firmly against the rubber washer 20 to seal the end of the tire valve. The spacing between the lugs 21 and 22, as also between the lugs 26 and 27, is made sufficiently great to permit a positive and appreciable camming action of the clamp member.

The casting 15 is provided with a radial bore 45 in coaxial alignment with the radial bore forming the V pocket in the upper casting 16, and within the bore 45 is fitted a tire deflating pin 46 having its lower end of a diameter to press-fit the bore 45, but the main body portion of which is materially reduced in diameter to provide a space thereabout for passage of air into and out of the tire. This pin 46 could be otherwise suitably formed as for example by hollow drilling the casting 15, or the pin could be formed as a separable member and secured in any other convenient fashion within the bore 45. The bore 45 has a closed bottom end, and the pin 46 is of a length such that its upper extremity lies above the plane of the top surface of the washer 20, and therefore is adapted to enter the tire valve and depress the valve stem pin (known as the valve insides) to keep said tire valve open when the valve is seated upon the washer 20.

The bore 45 is crossed at an angle by an air conduit formed by the coaxial bores 47 and 48, the latter extending from the bore 45 outwardly of the casting and terminating in a boss portion 49 which is internally threaded to receive a standard valve insides generally indicated by the numeral 50, the extreme end of the boss 49 being externally threaded to receive the usual air line hose connection, indicated in dotted lines in Fig. 1 by the numeral 51, as well as the dust cap 52 shown in Figs. 2 and 3. Thus it will be seen that when the tire valve is in the position shown in Fig. 3, air may be passed into the tire through said hose connection, conduit 48, bore 45, and through the tire valve, the valve insides 50 serving to keep the air in the tire upon removal of hose connection.

Preferably in the same radial plane with the conduit 48, but therebelow and not communicating therewith, there is provided a large bore 55 constituting a cylinder having disposed therein the piston 56 having a reduced portion 57 about which is disposed one end of a spring 58 the other end of which takes against the head of an adjusting screw 59 held against rotation by virtue of a peripheral outwardly extending lug 60 having sliding engagement in a longitudinally extending groove 61 in the face of the cylinder. The remainder of said screw is internally threaded within a socket member 62 extending through a centrally disposed aperture in the cap 63 externally threaded on the casting 15, and the outer extremity of the socket 62 is provided with a suitable means for rotating said socket, as for instance by the screw-driver slot shown. The exterior surface of the cap 63 is suitably marked so that changes in tension of the spring 58 may be made with accuracy. That is to say, from the description just given and with particular reference to Figs. 3 and 5, it will be understood that, by rotating the socket member 62, the screw 59 may be moved axially within the cylinder to increase or diminish the amount of tension on said spring, and that as a result the piston 56 will have greater or less resistance to movement within said bore caused by the force of the air pressure on the other side of said piston. In this respect, it should here be stated that the socket 62 has its innermost end flanged to seat against the inner surface of the cap 63 as will be understood.

Instead of the construction shown in Fig. 3 it is apparent that other means of tensioning the spring 58 may be employed such as shown in Figs. 9 to 12. As an example and referring to Fig. 9, the head of the non-rotatable screw 59 could be replaced by a cup-shaped or cylindrically formed follower 100 of a greater dimension from front to back and threaded to receive a stem 101 rigidly mounted on the cap 63 secured to the casting, thereby doing away with the socket member 62, but in this alternate construction it will be understood that rotation of the cap would be required to vary the tension on the spring 58. This cap rotation would be effectually accomplished by securing the cap as by the screws 102 to a split ring 103 sprung into a groove 104 formed in the outer surface of the spring chamber wall, the cap being provided with a smooth inner surface to pass over the threads 105, or these threads could obviously be omitted. If longitudinal axial movement of the cap 63 were not desired, it could have a partial threaded engagement with the casting as indicated in Fig. 11 so that after the cap had been screwed a certain distance the threads would automatically become disengaged and the cap would then be free to rotate without longitudinal movement on its axis, though permitting longitudinal movement of the spring follower. In this figure the follower 106 is likewise shown cylindrical but there is provided a central lug or boss 107 externally threaded to be engaged by the internally threaded stem 108 rigid with the cap, said lug disposed within the confines of the follower. In Figs. 3, 9 and 11 it is to be observed that cocking of the follower is prevented by relatively close cylindrical fits between operating members. In Fig. 3 this is governed by 62 fitting within 63, in Figs. 9 and 11 the stems 101 and 108 have cylindrical outer surfaces or enlargements closely fitting the cylindrical inner surfaces of the followers 100 and 106 respectively, though for clearness in the drawings there is shown a slight space between the stem 108 and its follower 106.

The opposite side of the casting 15 has a circular flange 70 having concentrically associated therewith an externally threaded boss portion 71 adapted to be threaded through the wall 6 of the brake-drum housing, and when said wall is not perpendicular, there may be provided wedge-shaped washers such as 72 and 73 to fit both sides of said wall, the result desired being to maintain the axis of the bore 17 coaxial with a radius of the wheel, thereby rendering the axis of the cylinder 55 substantially always in a horizontal plane. A lock nut 74 is screwed onto the extremity of the boss 71 to hold the entire device rigid with the brake-drum housing. To prevent rotation of the device the brake-drum wall 6 as well as the lock nut 74 may be threaded to receive a positioning or set screw 75, the head of which is adapted to enter a notch or recess 76 in the peripheral portions of the flange 70 and the washer 72, the other washer 73 being provided with a suitable bore through which the stem of the screw 75 may pass without threaded engagement. In this respect it will be readily understood that said notch of washer 72, and said bore of washer 73, and said screw 75 all cooperate to correctly position said washers with respect to the inclined wall of the brake-drum housing.

The boss 71 is provided with an interior bore 77 to receive a plug 78 of electrical insulation molded about a metallic conductor element whose innermost end 79 is adapted to be electrically contacted by the head 80 of the piston 56. The metal conductor element may be positively retained in the insulating plug in any suitable manner such for example as by providing annular grooves in said element into which the insulating medium may flow during the molding operation. This plug 78 may be threaded into the bore 77 or secured therein in any other suitable manner so that its innermost end will contact a shoulder formed by the coaxial bore 81 of a diameter less than the bore 77, the bore 81 being also coaxial with the cylinder 55 but being separated therefrom by a wall of the casting 15, which wall, however, has therethrough the small bore 82 coaxial with the bores 55 and 81, the bore 82 slidingly receiving therein a portion 83 of the piston, the outermost extremity of which carries the contact point 80, and in the portion 83 is a longitudinally extending groove 84 adapted to receive therein the end of a screw 85 threaded through the casting 15, whereby longitudinal movement as well as rotation of piston 56 is limited.

The contact point 80 is connected to the portion 83 of the piston preferably by a neck of reduced diameter and about this neck is disposed a centrally apertured rubber washer 86 of cup-shaped formation, but it is obvious that the contact point 80 could extend back to the portion 83 of the piston with the same diameter. Said washer fits the bore 81 which is milled on one side as at 87 to meet the end of the air conduit 47 as a result of which the region established by the bore 81 constitutes an air chamber in direct communication with the tire so that the pressure within said chamber is equal to the pressure in the tire when the tire valve is seated on its rubber washer 20. The pressure in said air chamber causes the cup-shaped washer 86 not only to be firmly pressed against the surface of the bore 81, but expands the web portion of said washer to tightly engage the shoulder created by the coaxial bores 81 and 82, thus preventing air from passing from said chamber to the cylinder 55.

In operation the device is fastened securely to the brake-drum housing so that the bore 17 is coaxial with a radius of the wheel and the cylinder 55 is at right angles thereto.

The tire is then applied to the wheel in the usual manner, that is with the opening in the felly uppermost down through which the tire valve may be inserted. This opening is made of appreciable size to permit a canting of the tire when passing its valve through said opening, and therefore the V-shaped pocket is provided in the upper portion of this device so that the end of the tire valve, after passing through the felly, will strike the inclined surface 18 of said pocket and be automatically and easily directed downward so that the end of the valve will ultimately come to rest in its correct radial position and seated upon the rubber washer 20.

When the insides of the valve 2 strikes the pin 46, if there be air under pressure in the tire, there may be a momentary escape of air before the end of the valve seats upon the rubber washer 20, but care is exercised in the assembly of these devices to the end that the position of the end of said pin and the thickness of said washer are precalculated so that the valve may come to rest on said washer without the escapement of any air from the tire. With the valve now opened by the pin 46, the air pressure will be communicated from the tire to the air chamber in which the electrical contact points 79 and 80 are disposed, and this pressure will force the piston 56 to the left as seen in Fig. 3 against the tension of its control spring 58, thereupon separating said contact points and breaking the circuit through the tire deflation indicator. In this respect it will be understood that the piston is in sliding metallic contact with the casting which latter is metallically connected to the brake-drum, and that said drum is in metallic contact with the chassis of the automobile, wherefore the contact point 80 is grounded electrically to said chassis.

For example, the air in a tire is intended to be at 35 pounds pressure and, from an economical and safety standpoint, said pressure is not desired to fall more than three pounds thereunder. Therefore, the control spring 58 is adjusted by virtue of the socket 62 and nut 63 to exert a pressure of say 32½ pounds which will permit said spring to actuate the piston 56 at a time to close the contacts 79 and 80 with a factor of safety of one-half pound of air pressure. In other words, with a desired pressure of 35 pounds in the tire, and a spring set or adjusted to move the piston with a force equivalent to 32½ pounds of air pressure, 2½ pounds of air pressure may be lost from the tire before the contacts 79 and 80 are brought together to give the signal through the indicator. When this signal is received the associated tire should be inflated to its proper pressure.

In order for the circuit to be completed, to the indicator, there is provided a metallic bar 90 of spring sheet material the free end of which is bent into a contact 91 adapted to permanently ride upon the surface of the metallic annular conductor ring 10 which latter is electrically connected to one side of the indicator, the other side of said indicator being connected to battery. The other end of the bar 90 is secured between two halves of a block 92 of insulating material, there being provided an opening 93 in one side of said block through which extends the end 94 of the contact element whose other end forms the switch contact point 79. The end of the bar 90 opposite the opening 93 is bowed in a direction toward said end 94 so that when the block 92 is secured as by the screws 95 to the lock nut 74, said end 94 will positively and electrically contact the bar 90. Therefore, it will be understood that from the source of current such as battery, the circuit is completed through the chassis of the automobile including the brake-drum housing, casting 15, piston 56, switch contact points 80 and 79, bar 90 to the annular ring 10 just above mentioned.

It might here be stated that the groove 84 in the piston is of a length only slightly greater than that necessary to close the contacts 79 and 80. In other words, in Fig. 3 these contact points are shown separated an amount sufficient to break the circuit through the indicator, and the air pressure within the air chamber is greater than the force of the spring 58 wherefore the piston is maintained in the position shown, the point of the screw 85 limiting the movement of the piston in that direction. This groove and screw therefor are highly instrumental in preventing any excessive pressure within the tire (created by any cause) moving the piston against the tension of its spring to such a point as would materially affect the cup-shaped washer 86, and possibly cause a set in the spring 58. The groove 84 permits movement of the piston in the opposite direction, under the action of its control spring, when the air pressure in the chamber is reduced, but only a sufficient distance to positively engage the contact points 79 and 80.

It is obvious that those skilled in the art may vary the details of construction as well as arrangements of parts without departing from the invention, and therefore it is not desired to be limited to the foregoing except as may be required by the claims.

What is claimed is:—

1. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring, and a cap on the outer end of the spring chamber and having an intermediate screw connector engaging the follower to adjust the spring pressure on said piston.

2. A pressure operated switch comprising a casing having a pressure chamber and a spring chamber therein and a contact at one end of the pressure chamber, a wall separating said chambers, a piston in the spring chamber having a contact extension projecting through said wall into the pressure chamber and provided with a packing sealing the pressure chamber, a spring bearing at one end against said piston, a follower in the spring chamber bearing against the other end of the spring, and a cap on the outer end of the spring chamber and having an intermediate screw connector engaging the follower to adjust the spring pressure on said piston.

3. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring, said follower having non-rotatable engagement with the wall of the spring chamber, and a cap on the outer end of the spring chamber and having an intermediate connector engaging the follower to adjust the spring pressure on said piston, said connector rotatable with respect to said cap.

4. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring said follower having a central recess in one end thereof, a cap on the outer end of the spring chamber and having a screw connection with the follower to adjust the latter, said cap further provided with a central enlargement closely fitting the recess of the follower for preventing transverse movement of the follower in said chamber.

5. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring, a cap on the outer end of the spring chamber and having a screw connection with the follower to adjust the latter, said cap and follower having centrally disposed cooperating engagement for preventing transverse movement of the follower in said chamber.

6. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring said follower having a cavity and a boss disposed in said cavity, a cap on the outer end of the spring chamber and having a central projection entering said cavity and having threaded engagement with said boss for adjusting the position of the follower in the spring chamber.

7. A pressure operated switch comprising a casing having a pressure chamber and a spring chamber therein and a contact at one end of the pressure chamber, a piston in the spring chamber having a contact extension projecting into the pressure chamber, a spring bearing at one end against said piston, a follower in the spring chamber bearing against the other end of the spring said follower comprising a cylinder fitting within the coils of one end of said spring, the follower provided with a boss centrally disposed at one end of the cylinder, a cap on the outer end of the spring chamber and having a central projection closely fitting said cylinder and having threaded engagement with said boss for adjusting the position of the follower in the spring chamber while simultaneously preventing transverse movement of the follower.

8. A pressure operated switch comprising a casing having a pressure chamber and a spring chamber therein and a contact at one end of the pressure chamber, a wall separating said chambers and provided with an opening therethrough, a piston having one end freely slidable in the spring chamber and having its other end of a reduced diameter to establish a contact extension engageable with said first mentioned contact, said extension projecting into the pressure chamber with a sliding fit through the opening of said wall thereby preventing cocking of said piston during its reciprocations, a spring bearing at one end against said piston, a follower in the spring chamber bearing against the other end of the spring, and a cap on the outer end of the spring chamber and having an intermediate screw connector engaging the follower to adjust the spring pressure on said piston.

CAREY W. JOHNSTON.